Figures 7, 9:
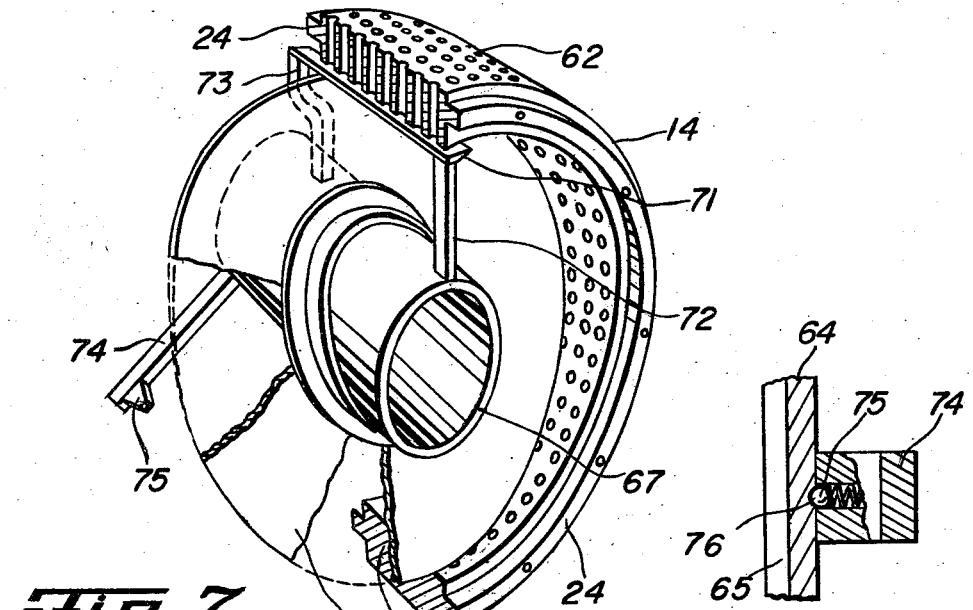

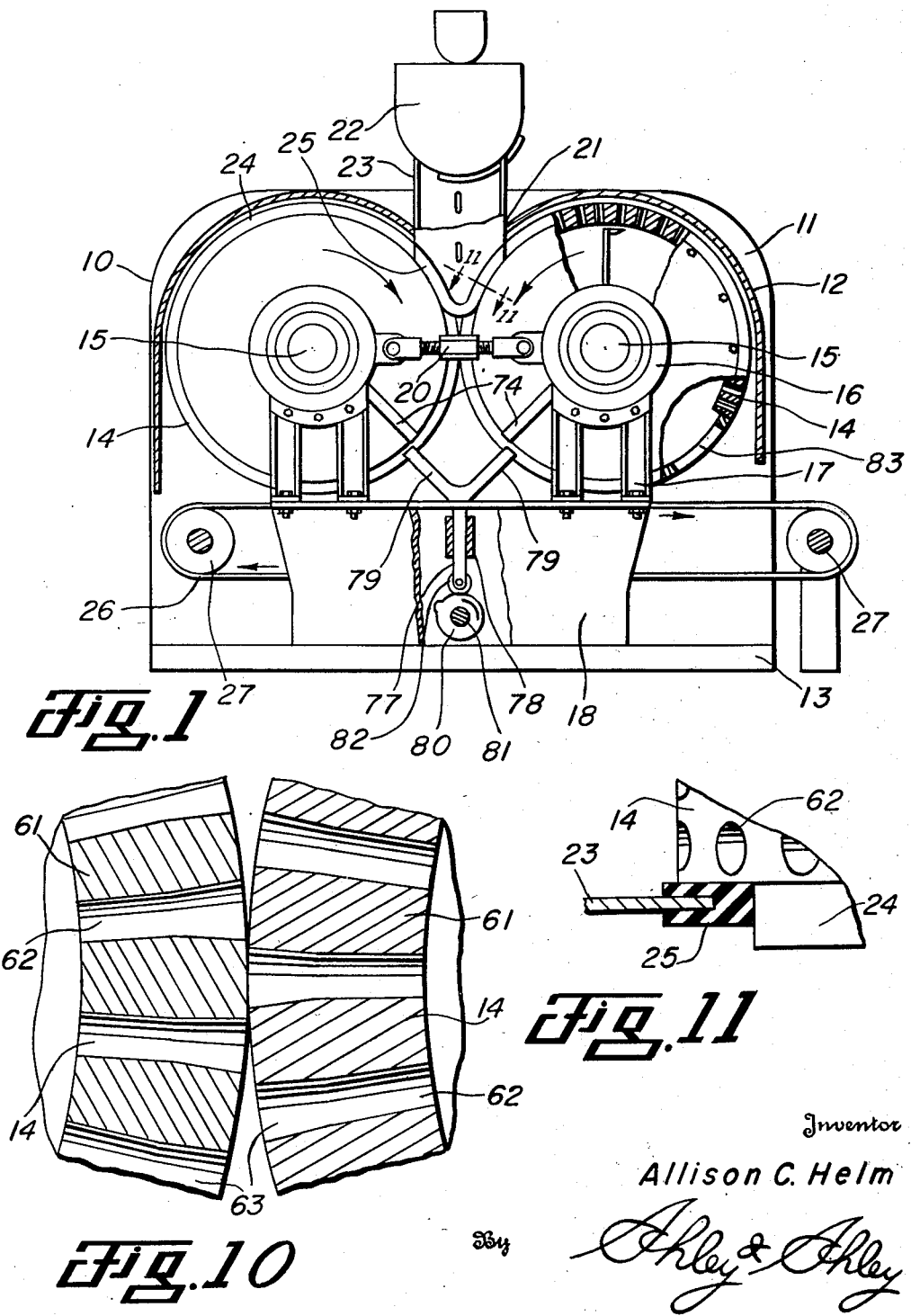

April 20, 1954   A. C. HELM   2,675,768
MACHINE FOR FORMING FEED PELLETS
Filed May 8, 1950                               5 Sheets-Sheet 2
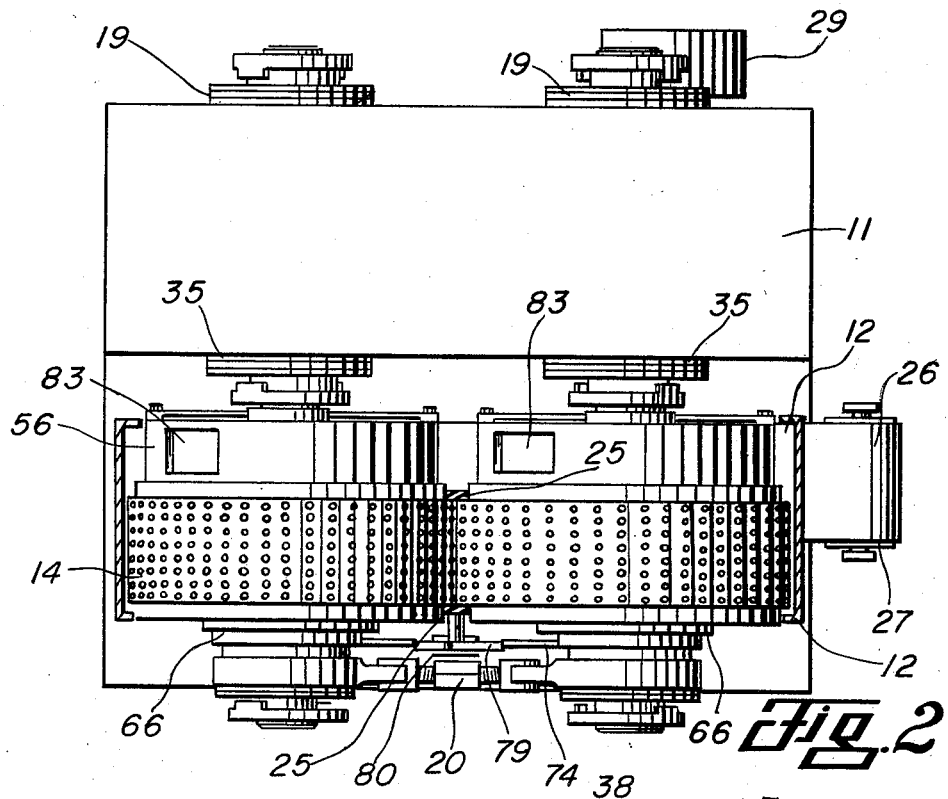
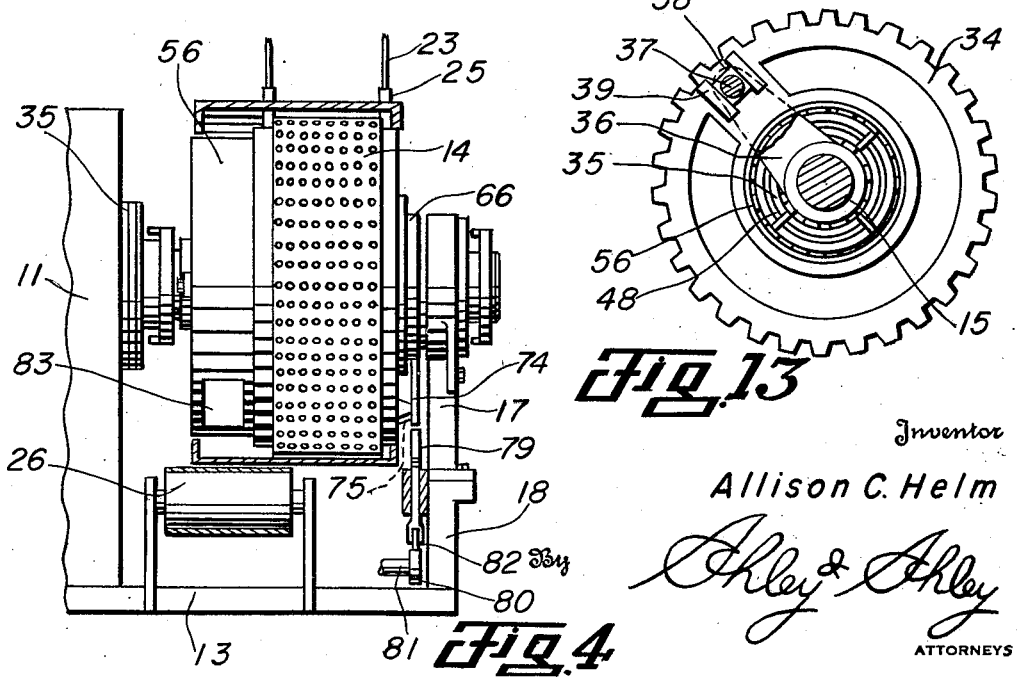
Inventor
Allison C. Helm
ATTORNEYS

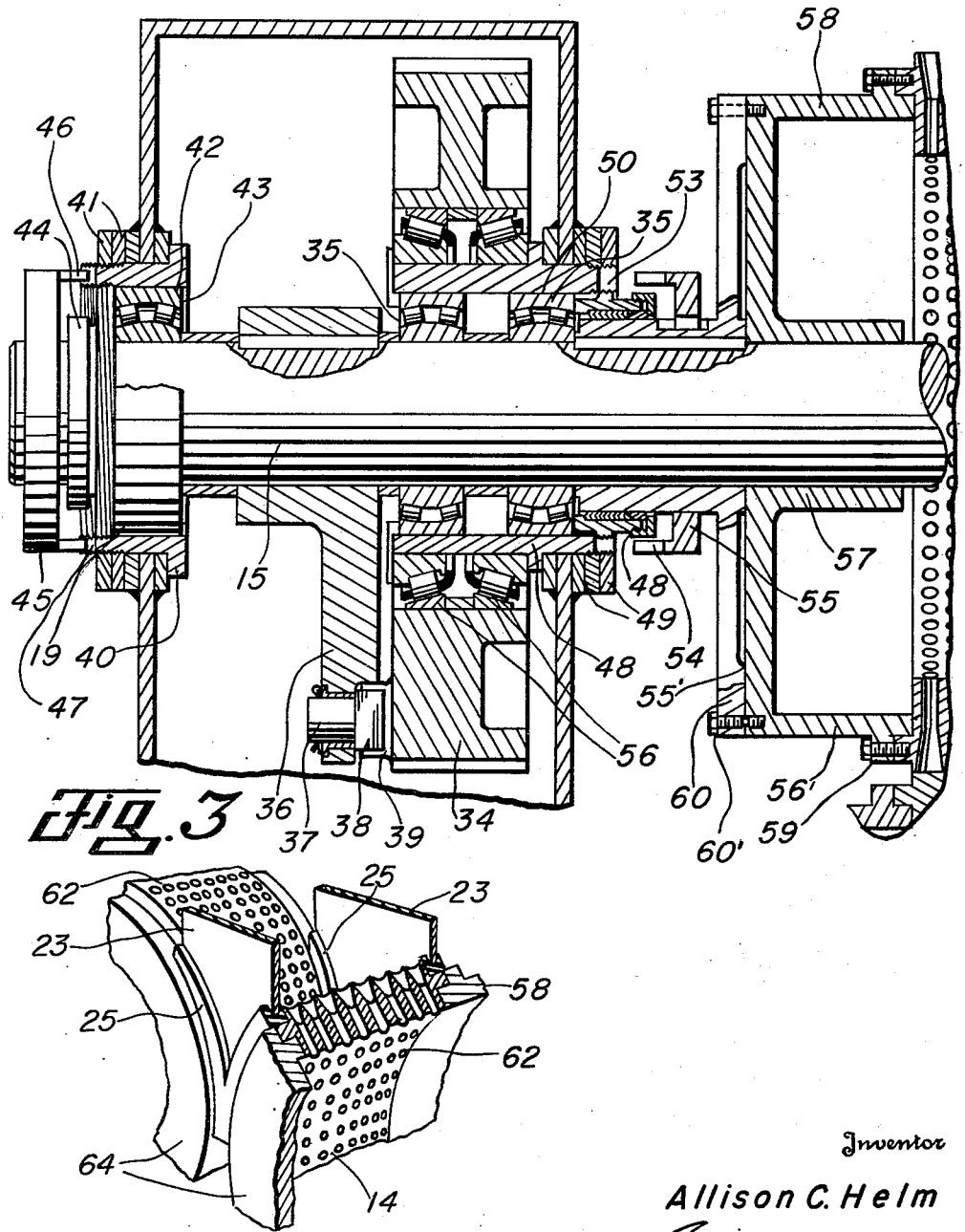

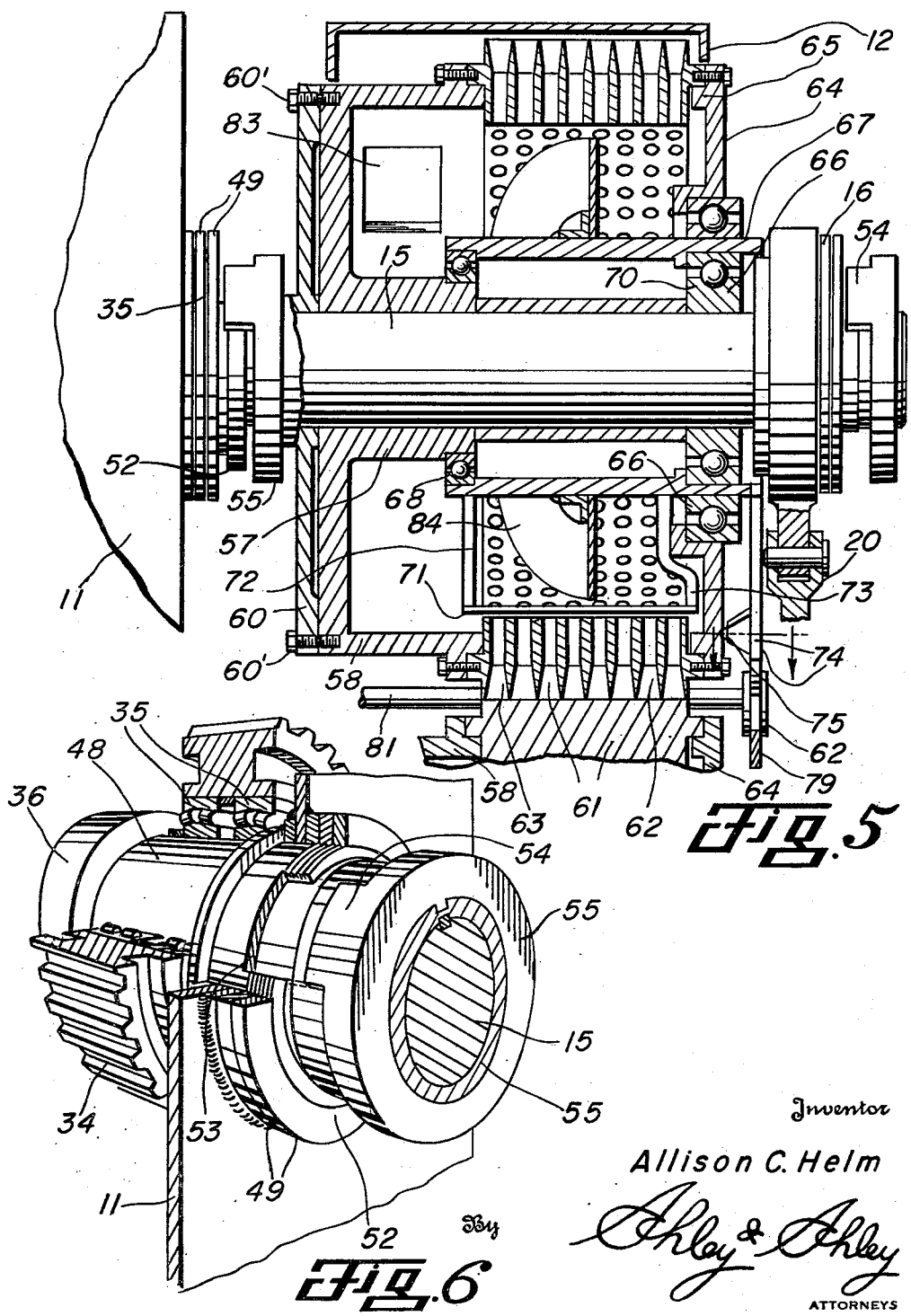

April 20, 1954   A. C. HELM   2,675,768
MACHINE FOR FORMING FEED PELLETS
Filed May 8, 1950   5 Sheets—Sheet 5

Inventor
Allison C. Helm
By
Ashley & Ashley
ATTORNEYS

Patented Apr. 20, 1954

2,675,768

UNITED STATES PATENT OFFICE 2,675,768

MACHINE FOR FORMING FEED PELLETS

Allison C. Helm, Fort Worth, Tex.

Application May 8, 1950, Serial No. 160,626

5 Claims. (Cl. 107—8)

This invention relates to new and useful improvements in machines for forming feed pellets.

One object of the invention is to provide an improved machine for forming livestock and poultry feed pellets whereby the pellets will be of uniform length to facilitate handling and feeding of the same and will be thoroughly cured so as to prevent swelling and disintegration thereof.

A particular object of the invention is to provide an improved feed pellet forming machine which includes a pair of coacting circular dies having apertured peripheral walls and adapted to be rotated about their respective axes with their peripheries in constant rolling contact whereby feed directed between the dies is forced into the peripheral apertures and compressed there into pellets.

An important object of the invention is to provide an improved pellet forming machine, of the character described, wherein the dies are annular and of a diameter and width sufficient to have a multiplicity of openings whereby the pellets remain in the openings a prolonged period of time to assure thorough curing of said pellets and prevent swelling and disintegration thereof upon being extruded from said openings.

Another object of the invention is to provide a pellet forming machine, of the character described, having an improved knife mounted in engagement with the inner peripheral surface of each die between the openings thereof and adapted to rotate with the die, the knife being arranged to be held stationary during one complete revolution of said die at predetermined intervals so as to cut off the pellets flush with said inner peripheral surface and assure uniform length of said pellets.

A further object of the invention is to provide an improved pellet forming machine, of the character described, wherein its dies are supported by eccentric bearing means to permit fine adjustment of the dies relative to each other for obtaining rolling contact of said dies without binding thereof and for maintaining such contact upon wear of the dies.

Still another object of the invention is to provide an improved pellet forming machine, of the character described, which is so constructed that the feed is prevented from contacting the bearings of the machine whereby the usual abrasive wear of said bearings is eliminated.

A construction designed to carry out the invention will be hereinafter described together with other features of the invention.

Figure 8:
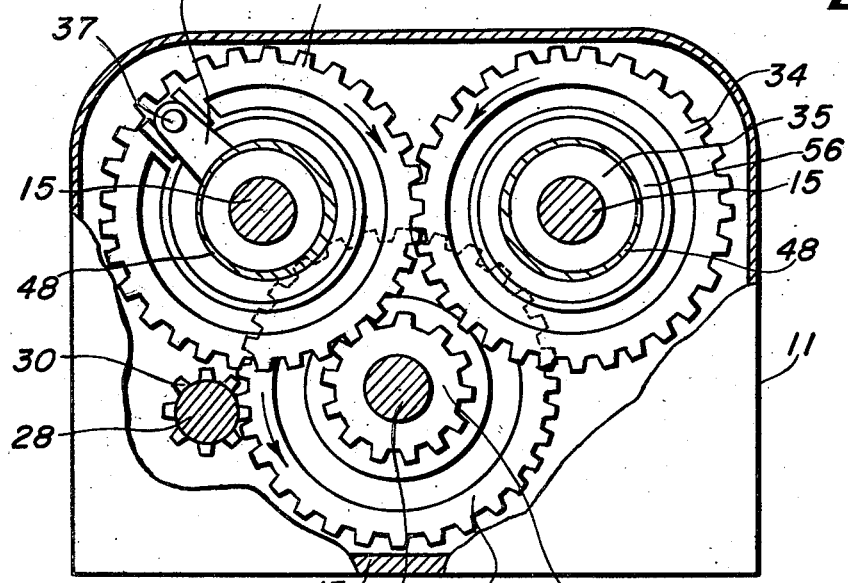

The invention will be more readily understood from a reading of the specification and by reference to the accompanying drawings, wherein an example of the invention is shown, and wherein:

Fig. 1 is a front elevational view, partly in section, of a pellet forming machine constructed in accordance with the invention, Fig. 2 is a plan view of the machine with a portion of its housing in section to show the relation of the pellet forming dies, Fig. 3 is a horizontal, cross-sectional view, showing one of the die shafts and its drive gear, Fig. 4 is an end elevation view, partly in section, of the machine, Fig. 5 is a view, similar to Fig. 3, showing one of the dies, its knife and deflector, Fig. 6 is a perspective view, partly in section, of one of the eccentric bearings for permitting adjustment of the shafts and dies, Fig. 7 is a perspective view, partly in section, of one of the dies, Fig. 8 is a rear elevational view, partly in section, showing the relation of the gear drive, Fig. 9 is an enlarged, cross-sectional view, taken on the line 9—9 of Fig. 5, showing the frictional connection of the knife arm to its die, Fig. 10 is an enlarged, sectional view of the contacting portions of the dies, showing the relation of their openings, Fig. 11 is an enlarged, sectional view, taken on the line 11—11 of Fig. 1, Fig. 12 is a perspective view showing the relation of the feeder guide plates to the dies, and Fig. 13 is an elevational view, partly in section, showing one of the drive gears and its connection to the die shaft.

In the drawings, the numeral 10 designates a pellet forming machine which includes an upright gear case 11 having a die housing or cover 12 connected thereto and mounted upon a heavy base plate 13. A pair of annular or circular, rotatable dies 14 are mounted above the base plate 13 upon parallel, horizontally-alined shafts 15 which extend transversely through and project forwardly beyond the case 11. The forward ends of the shafts 15 are journaled in bearings 16 supported by pillow blocks 17 which are bolted or otherwise secured to a bracket 18 projecting upwardly from the base plate. Similar bearings 19 are mounted in the rear wall of the gear case for supporting the rear ends of the shafts (Figs. 2 and 3). For fastening and maintaining the bearings 16 in fixed relations, a turnbuckle 20 is pivotally connected to and between said bearings. It is noted that the peripheral faces of the dies 14 are in rolling contact and have appreciable width so as to define a trough or space thereabove and therebetween which is substantially triangular in cross-section. An opening 21 is provided in the top of the housing 12, which substantially conforms to the contour of the dies, above this space for receiving feed in loose granular or meal form from a feeder 22. The feed is directed through the opening 21 by a pair of spaced, vertically-adjustable guide plates 23 depending from the feeder 22 into said opening and having their lower ends conforming to the dies (Figs. 11 and 12). Axially-extending, annular flanges 24 are formed on the ends or margins of the dies and are engaged by sealing elements 25 of rubber or other elastic material carried by the lower ends of the guide plates 23, whereby the feed is confined in the space between the peripheral faces of said dies. The pellets formed by the dies drop onto an endless conveyor or drag belt 26 extending horizontally below said dies and mounted upon suitable pulleys 27. Although not illustrated, the housing is adapted to be supported by the gear case 11 and is preferably made in sections to facilitate removal.

A drive shaft 28, having a drive pulley 29 mounted on its outer end and gear teeth 30 formed on its inner end, extends transversely into the gear case as shown in Figs. 2 and 8. The gear teeth 30 are in constant mesh with a large gear 31 mounted on a shaft 32 which is parallel to the drive shaft 28 and carries a pinion 33. A pair of meshing large gears 34 are rotatably mounted on the rear portions of the shafts 15 and one of these gears is in constant mesh with the pinion 33, whereby one of said gears drives the other. The drive shaft is adapted to be rotated in a clockwise direction (Fig. 8) so as to turn the shaft 32 in an opposite or counter-clockwise direction. Thus, the left-hand shaft 15 is rotated clockwise and the right-hand shaft counter-clockwise, whereby the dies mounted on said shafts turn inwardly and downwardly toward each other. A pair of bearings 35 are mounted in the front wall of the gear case to rotatably support the gears 34. For connecting each gear to its shaft, a radial crank arm 36 is keyed on each die shaft and has a pin 37 rotatably mounted in its outer end so as to extend parallel to the axis of the shaft as shown in Figs. 3 and 13. The end of the pin adjacent the gear has a square head 38 which is slidably confined between a pair of substantially radial, parallel ribs 39 formed on the side of said gear. Due to this slidable connection, rotation of the gears is imparted to the die shafts.

To permit adjustment of the dies relative to each other upon installation as well as upon wear of their peripheral faces, the shafts 15 are eccentrically mounted in the bearings 16, 19 and 35. All of the eccentric bearings are similar and since the bearings 16 and 19 are substantially identical, said bearings 16 are not shown nor described in detail. As shown in Fig. 3, each bearing 19 includes a flanged collar 40 clamped in position by lock rings 41 screw-threaded upon its free outer end and having an eccentric bore 42. A roller bearing assembly 43 is confined in the bore 42 for rotatably supporting the shaft in the collar 40 which has its outer end sealed by a suitable stuffing box 44. The shaft projects beyond the collar and has an adjusting ring 45 keyed to its outer end so as to be slidable toward said collar. Inwardly-directed lugs 46 are formed on the ring 45 for engaging recesses or slots 47 formed in the outer end of the collar and connecting said collar to the shaft when said ring is slid toward said collar. Upon loosening of the lock rings and engagement of the lugs 46 with the recesses 47, the collar may be rotated by turning the shaft to vary the position of the eccentric bore 42 of said collar. Each bearing 35 includes a similar collar or sleeve 48 clamped in position by similar lock rings 49 and having a similar eccentric bore 50 with roller bearing assemblies 51 confined therein for rotatably supporting the shaft (Fig. 6). A stuffing box 52 packs off the outer end of the collar 48 which has slots or recesses 53 formed therein for receiving the inwardly-directed lugs 54 of an adjusting ring 55 keyed on a spacer collar 55' which in turn is keyed to the shaft. The gear 34 is rotatably mounted on the collar 48 by a pair of roller bearing assemblies 56. Manifestly, either one or both of the dies 14 may be adjusted by means of the eccentric bearings which permit adjustment of the shafts relative to their gears 34, the gear case and the die housing.

As has been explained, each die is annular and has axially-extending flanges 24 formed on its ends for coacting with the guide plates 23 and their sealing elements 25. A circular drum 56, having an axial hub 57 and an annular, peripheral flange 58, is mounted on each shaft rearwardly of the die for supporting said die (Fig. 3). The flange 58 of the drum engages within the rear flange 24 of the die and has an external, radial shoulder or rib 59 adjacent its outer margin overlying and bolted or otherwise secured to the end of said die flange. A crosshead 60 is keyed to the shaft rearwardly of the drum 56 and has its ends secured to the rear surface of said drum by suitable shear pins 60' for connecting the die to the shaft. Manifestly, the provision of the shear pins 60' prevent damaging of the dies by foreign material which might be present in the feed. Each die has a relatively thick body or wall 61 in which a multiplicity of radial openings 62 are formed in equally-spaced relation (Fig. 7). The external peripheral surface of the body 61 is suitably machined to provide the die face. It is noted that the width of the body is sufficient to accommodate a number of the openings 62 which are preferably arranged in transverse and circumferential, parallel rows. As shown by the numeral 63 (Figs. 5 and 10), the outer ends of the die openings are enlarged and taper inwardly. To assure compressing of the feed, the openings of one die are preferably offset relative to the openings of the other die by rotatable adjustment of the dies. Thus, the die openings have their outer ends closed by the blank spaces on the peripheral face of the other die between its openings.

A cover plate 64 is bolted or otherwise secured to the front flange 24 of each die for supporting and closing the front end of the die and has an annular flange or shoulder 65 formed on its rear surface for engaging within said die flange (Fig. 5). The plate 64 is rotatably mounted upon the shaft 15 by a bearing 66 which includes a concentric sleeve 67 journaled upon said shaft by ball bearing assemblies 68 and 69. An outer ball bearing assembly 70 is interposed between the plate 64 and the sleeve 67. It is noted that the bearing assembly 68 is mounted on the hub 57 of the drum, while the assembly 69 is mounted on the shaft. Due to this arrangement, it is readily apparent that the die and its front plate may rotate with the shaft relative to the sleeve.

For cutting off the pellets extruded from the die openings, a knife or breaker bar 71 in the form of an elongate, straight blade extends transversely of each die and is held in engagement with the inner peripheral surface of the die by a pair of arms 72 and 73 projecting radially from the end portions of the sleeve 67. As shown in Figs. 5 and 7, the front arm 73 is angular and has its inner end offset rearwardly so as to clear the cover plate 64 and its bearing assembly 70. Normally, the knife 71 is inoperative and rotates with the die. In order to releasably connect the knife to the die and hold said knife in a relatively fixed position between adjacent transverse rows of the openings 62, the sleeve projects forwardly of the plate 64 and has a radial arm or lever on its outer end. A spring-pressed ball or detent 75 is carried by the lever 74 for engaging a complementary recess 76 formed in the plate (Fig. 9). Thus, the knife is frictionally latched to the die and rotates therewith so long as the ball 75 is engaged with its recess. For operating the knives, an upright, actuating element or rod 77 is slidably mounted in a guide collar 78 carried by the bracket 18. As shown in Fig. 1, the actuating rod 77 is substantially Y-shaped and has a pair of outwardly-inclined arms 79 at its upper end for coacting with the levers 74. A cam wheel 80 is mounted on a transverse shaft 81, which is suitably driven, below the actuating rod and a roller 82 carried by the lower end of said rod rides upon its periphery. The cam wheel 80 is adapted to be rotated slowly or at predetermined intervals to operate the knives intermittently. Upon engagement of the lobe of the cam wheel with the roller 82, the actuating rod is raised so as to engage its arms 79 with the levers 74 and prevent rotation of the knives. Due to the frictional latch provided by each lever 74, its spring-pressed ball 75 and the coacting recess 76, the sleeves and the knives are readily disconnected from their dies. Therefore, upon continued rotation of the dies, the pellets extruded from the openings 62 are engaged by the knives so as to be cut or broken off substantially flush with the inner peripheral surfaces of said dies. It is noted that the knives are adapted to be held stationary only during one complete revolution of the dies and that the engagement of the balls 75 with their recesses 76 again latches the sleeves and knives to their dies. Thus, the knives rotate with the dies until the actuating rod is raised again by one of the cam lobes engaging its roller 82. Manifestly, pellets of the desired uniform length may be formed due to this arrangement.

As shown in Figs. 2 and 3, the interior of each drum 56 communicates with the rear end of its die and serves as a hopper for receiving pellets therefrom. An opening 83 is provided in the peripheral flange 58 of the drum to discharge the pellets onto the conveyor 26 which carries the same to the chute 27. In order to direct the pellets from the die into the hopper formed by the drum, an annular, inclined deflector or cantboard 84 is rotatably mounted on the sleeve 67 within said die. The inclination of the deflector 84 is rearwardly and downwardly from the front to the rear of the die so as to catch the cut pellets and direct the same rearwardly into the drum. A suitable weight 85 is mounted on the lower underside of the deflector to maintain the same in the angular relation shown. Since the deflector is stationary, it is essential that its perimeter be spaced from the inner peripheral surface of the rotating die sufficiently to clear the knife and the extruded pellets projecting from the openings of said die.

As has been explained, the feed in meal or other loose form is delivered to the trough between the peripheral faces of the dies 14 from the feeder 22 and is confined by the guide plates 23 which engage the marginal flanges 24 of said dies. The rotation of the dies toward each other forces the feed into the openings 62 so as to compress the same into cylindrical or pellet form. When the openings of one die are offset relative to the other die as shown in Fig. 10, thorough compacting of the pellets is assured. Due to the use of a pair of coacting dies of relatively large diameter and width, the number of die openings is greatly increased so as to make possible a fast and efficient rate of production without sacrificing the quality of the pellets. In fact, the rotation of the dies is preferably relatively slow so as to prevent overloading of the machine. The large number of die openings permits the pellets to remain in said openings a prolonged period of time so as to assure curing thereof and prevent undue swelling upon extrusion. Since the forming operation is of extended duration, the taper 63 of the die openings need not be great and minimum power is required to perform said forming operation. The intermittent actuation of the knives 71 assures substantially uniform length of the pellets which are directed into the drums 56 by the deflectors 84. From the drums, the pellets fall through the openings 83 and onto the conveyor 26 so as to be conducted to the discharge chute 27. Since the knives normally rotate with the dies and are disposed between the adjacent rows of openings, the same do not interfere with the forming operation.

The eccentric bearings 16, 19 and 35 permit initial adjustment of the shafts 15 as well as subsequent adjustment upon wear of the die faces, whereby constant rolling contact of said faces is assured. Since the bearings are exposed, the same may be readily adjusted whenever desired. The front ends of the shafts are held in fixed relation by the turnbuckle 20 which may be loosened to facilitate removal thereof. Due to the sliding connection provided between each shaft and its gear 34 by the crank arm 36, its pin 37 and the ribs 39, the adjustment of the dies and shafts does not affect the gear drive. It is noted that any suitable material or mixture of materials may be used in the feed. Also, a greater percentage of molasses may be employed and need not be dehydrated. This is due to the fact that a minimum of working parts are exposed to the feed. The bearings 19 and 35 are spaced from the dies and are protected by the gear case, while the bearings 16 can be contacted only by the compressed pellets. Only the top of the die housing 12, the guide plates 23 and the dies are exposed to the feed and the exposure of said housing top is restricted to the margins of the opening 21. Manifestly, this arrangement permits rapid cleaning of the machine so as to reduce loss of productive time to a minimum.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A machine for forming feed pellets including, a pair of parallel shafts, a circular die mounted on each shaft and having an annular body, means for rotating the shafts in opposite directions to turn the dies in opposite directions, die faces formed on the external peripheries of the bodies in rolling contact with each other, a multiplicity of radial openings extending through the die faces and bodies, means for directing feed between said die faces whereby the feed is forced into the openings and extruded from the inner ends thereof in compressed pellets, a knife mounted in each die on its shaft in engagement with the inner periphery of its body, frictional means releasably connecting each knife to its die whereby the knives rotate with their dies, and means engageable with the frictional connecting means for holding said knives stationary during rotation of said dies to cut off pellets flush with said body inner periphery.

2. A machine for forming feed pellets including, a pair of parallel shafts, a circular die mounted on each shaft and having an annular body, means for rotating the shafts in opposite directions to turn the dies in opposite directions, die faces formed on the external peripheries of the bodies in rolling contact with each other, a multiplicity of radial openings extending through the die faces and bodies, means for directing feed between said die faces whereby the feed is forced into the openings and extruded from the inner ends thereof in compressed pellets, severing means mounted upon each shaft in close proximity to the inner peripheral surface of each die, means for optionally holding said severing means in a fixed relationship with respect to the rotation of each die, hopper means mounted on each shaft so as to be rotatable with its die and communicate with the interior of said die for receiving pellets therefrom and discharging the same, and deflecting means mounted on and rotatable with each shaft in each die for directing pellets into the hopper means.

3. A feed pellet forming machine including, a pair of parallel shafts, an annular die mounted on each shaft and having a plurality of radial apertures, gear means for driving the shafts and dies in opposite directions, the dies having their peripheral surfaces in rolling contact whereby feed directed between the surfaces is forced into the apertures and extruded from the inner ends thereof in compressed pellets, a knife journaled upon each shaft in engagement with the inner peripheral surface of each die, a latch arm extending between the knife and die and having positive connection with one and frictional connection with the other whereby said knife is rotatable with said die, and an actuating element engageable with the arm for releasing its frictional connection and holding said knife stationary to cut off pellets flush with said inner peripheral surface.

4. A feed pellet forming machine including, a pair of parallel horizontally-alined shafts, a drum mounted on each shaft, an annular die supported on each shaft by its drum and having a plurality of radial apertures, meshing drive gears for rotating the shafts, drums and dies in opposite directions, the dies having their peripheral surfaces in rolling contact for receiving feed therebetween and forcing the same into the apertures whereby the feed is compressed and extruded from the inner ends of said apertures, a knife mounted on each shaft in close proximity to the inner peripheral surface of each die and releasably connected to the die so as to be rotatable therewith, intermittently-actuated means for disconnecting the knife from its die and holding said knife stationary to cut off the extruded compressed feed flush with said inner peripheral surface, the interiors of the drums communicating with the interiors of said dies for receiving said compressed feed therefrom, and an annular deflector mounted in each die for directing said compressed feed into its drum, said drums having discharge openings in their peripheries.

5. A feed pellet forming machine including, a pair of parallel shafts, a drum mounted on each shaft, an annular die supported on each shaft by its drum and having a plurality of radial apertures, meshing drive gears for rotating the shafts in opposite directions, the dies having their peripheral surfaces in rotating contact for receiving feed therebetween and forcing the same into the apertures whereby the feed is compressed and extruded from the inner ends of said apertures, a knife journaled upon each shaft in close proximity to the inner peripheral surface of its die, means holding each knife stationary to cut off the extruded compressed feed, the interior of each drum communicating with the interior of its die for receiving the compressed feed therefrom, and an annular deflector mounted on and rotatable with each shaft in its die for directing the compressed feed into its drum, each drum having a peripheral discharge opening.

References Cited in the file of this patent

UNITED STATES PATENTS

| Number | Name | Date |
|---|---|---|
| 1,127,925 | Schueller | Feb. 9, 1915 |
| 1,909,228 | Sizer | May 16, 1933 |
| 2,052,449 | Connell | Aug. 25, 1936 |
| 2,167,900 | Meakin | Aug. 1, 1939 |
| 2,186,415 | Haworth | Jan. 9, 1940 |

FOREIGN PATENTS

| Number | Country | Date |
|---|---|---|
| 343,749 | Great Britain | Feb. 26, 1931 |